United States Patent
Korchev et al.

(10) Patent No.: US 10,860,022 B2
(45) Date of Patent: Dec. 8, 2020

(54) METHOD AND APPARATUS FOR AUTOMATICAL RULE LEARNING FOR AUTONOMOUS DRIVING

(71) Applicant: GM GLOBAL TECHNOLOGY OPERATIONS LLC, Detroit, MI (US)

(72) Inventors: Dmitriy V. Korchev, Irvine, CA (US); Rajan Bhattacharyya, Sherman Oaks, CA (US); Aruna Jammalamadaka, Calabasas, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 15/950,241

(22) Filed: Apr. 11, 2018

(65) Prior Publication Data
US 2019/0317496 A1 Oct. 17, 2019

(51) Int. Cl.
*G05D 1/00* (2006.01)
*G05D 1/02* (2020.01)

(52) U.S. Cl.
CPC ......... *G05D 1/0088* (2013.01); *G05D 1/0221* (2013.01)

(58) Field of Classification Search
CPC ...... B60W 10/10; B60W 50/00; B60W 10/20; G05D 1/0088; G05D 1/0221
See application file for complete search history.

(56) References Cited

U.S. PATENT DOCUMENTS

2017/0277197 A1* 9/2017 Liao ........................ G06T 7/20
2018/0181138 A1* 6/2018 Hashimoto .......... G05D 1/0088

* cited by examiner

*Primary Examiner* — Ramsey Refai
(74) *Attorney, Agent, or Firm* — Lorenz & Kopf LLP

(57) ABSTRACT

The present application generally relates to a method and apparatus for generating an action policy for controlling an autonomous vehicle. In particular, the method is operative to receive an input indicative of a training event, segmenting the driving episode into a plurality of time steps, generate a parse tree in response to each time step, and generate a most probable parse tree from a combination of the generated parse trees.

19 Claims, 4 Drawing Sheets

300

METHOD AND APPARATUS FOR AUTOMATICAL RULE LEARNING FOR AUTONOMOUS DRIVING

BACKGROUND

The present disclosure relates generally to programming autonomous motor vehicle control systems. More specifically, aspects of this disclosure relate to systems, methods and devices for behavior planning using automatically generating curriculum sequence based reinforcement learning for autonomous vehicles in a complicated environment.

BACKGROUND INFORMATION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Appropriate situation awareness is essential for autonomous driving due to safety concerns. Even though it is desirable to put all available information into autonomous driving decision process; however, for practical implementation, input data to the system should be limited and manageable; therefore it needs to be well-designed for both efficiency and sufficiency for decision making. An autonomous vehicle generally must generate a data structure to perceive situations around the vehicle. Through sensors mounted on the autonomous driving vehicle, a huge amount of information is delivered to the system; therefore, efficient analysis of all perception data for safe driving is crucial.

Dense urban environments, with their corresponding large amounts of information are particularly difficult for both autonomous vehicles and human drivers. For example, how to approach and then traverse an urban intersection is a difficult problem and is a situation where most traffic accidents take place. The main reason for this high rate of accidents lies in the abundance of external factors the driver needs to pay attention to. While approaching a stop-sign, the driver needs to pay attention to the vehicle in front of it in order to avoid being too close or too far from it. At the same time, a driver needs to stop at the stop line accurately so that it will not block the intersection or crash into other vehicles approaching from other directions. Subsequently, the driver needs to make the proper decision on when to initiate the traverse the intersection. New drivers may have difficulty knowing when to traverse and even some experienced drivers may miss important traffic information. Autonomous driving behavior at intersections therefore is potentially very beneficial. However, in order to design a reliable planning algorithm allowing a self-driving vehicle to make safe decisions, engineers need to be insightful enough to foresee every possible bad situation. Unpredictable environment changes and frequent human interactions in complicated city scenarios will influence the algorithm and make it extremely hard to handle various planning tasks, such as whether it is safe to go forward, or what the proper relative distance is to the front vehicle.

Our invention is a novel method for creation of an autonomous driving system using real driving data. We represent the actions of other agents (provided by sensors) in the scene via temporal sequences called "episodes". Developing self-driving vehicles is a very tedious process because of the considerable number of rules required to perform driving tasks. Our system adaptively creates new rules automatically by extracting and segmenting valuable information about other agents and their interactions. During the training phase, the system automatically segments driving episodes and extracts rules from real driving data. These rules, which take the form of a "temporal grammar" or "episodic memory" are stored in a "semantic memory" module for later use. During the testing phase, the system segments constantly changing situations, finds the corresponding parse tree, and applies the rules stored in semantic memory to stop, yield, continue driving, etc. Unlike traditional deep driving methods that require significant amount of training data to achieve desired quality, our method demonstrates good results with just a few training examples. The system requires some human supervision during training to avoid learning incorrect driving rules like missing a stop sign, running a red light, etc.

Our system is better than traditional rule based ones because it removes the tedious process of manual creation of these rules that the system needs to follow during driving in different situations, conditions, and interactions with other agents in the scene. Unlike traditional deep driving methods that require significant amount of training data to achieve desired quality, our method demonstrates good results with just a few training examples.

Prior art uses rule based systems (Czubenko M. et al) that require significant effort in describing these rules in the system. Another advantage of the proposed method is that traditional machine learning algorithms (Chen C. et al) require a large number of training examples to achieve acceptable performance. Our method achieves very good results just with a few training examples. The rules learned by the proposed system have representation that is easily understandable by humans unlike other machine learning based methods. Another advantage of the proposed system is that these rules can be easily modified, altered, added or removed from the system by a human with minimal retraining.

Our invention is not obvious because it uses a novel method for learning driving rules based on a semantic representation of the situation. Our invention automatically segments the states of the agents in the scene and creates rules from the observed data without any human interaction. The human must only ensure that the data provided represent valid driving situations.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, a method of controlling a vehicle comprising determining an autonomous driving episode in response to a sensor signal, segmenting the autonomous driving episode into a first event and a second event, segmenting the first event into a first time step and a second time step and the second event into a third time step and a fourth time step, generating a first association matrix in response to the first time step, a second association matrix in response to the second time step, a third association matrix in response to the third time step and a fourth association matrix in response to the fourth time step. The association matrices for all training time steps are processed with perceptual expectation maximization algorithm to obtain a spatial grammar in form of 3D tensor. 3D tensor in response to the transition matrix, determining a probable time step in response to the 3D tensor, generating a probable event in response to the probable time step, and generating a control signal for controlling an autonomous vehicle in response to the probable event.

In accordance with another aspect of the present invention an apparatus comprising a sensor for sensing an environment proximate to an autonomous vehicle and generating a sensor signal, a perception module for detecting an agent within the environment in response to the sensor signal, an agent motion predictor for predicting a motion of the agent within the environment in response to the detection of the agent, a cognitive module for determining a driving episode in response to the predicted motion of the agent, for segmenting the driving episode into a first time step and a second time step, for receiving a first driving data indicating a first action in response to the first time step and a second driving data indicating a second action in response to the second driving data, for generating a rule in response to the first action and the second action for generating a control signal in response to the rule, and a motion control module for receiving the control signal and controlling an autonomous vehicle in response to the control signal.

In accordance with another aspect of the present invention A method of controlling a vehicle comprising receiving an input indicative of a training event, segmenting the driving episode into a first time step and a second time, receiving a first driving data indicating a first action in response to the first time step and a second driving data indicating a second action in response to the second driving data, generating a rule in response to the first action and the second action, and controlling an autonomous vehicle in response to a driving event and the rule The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
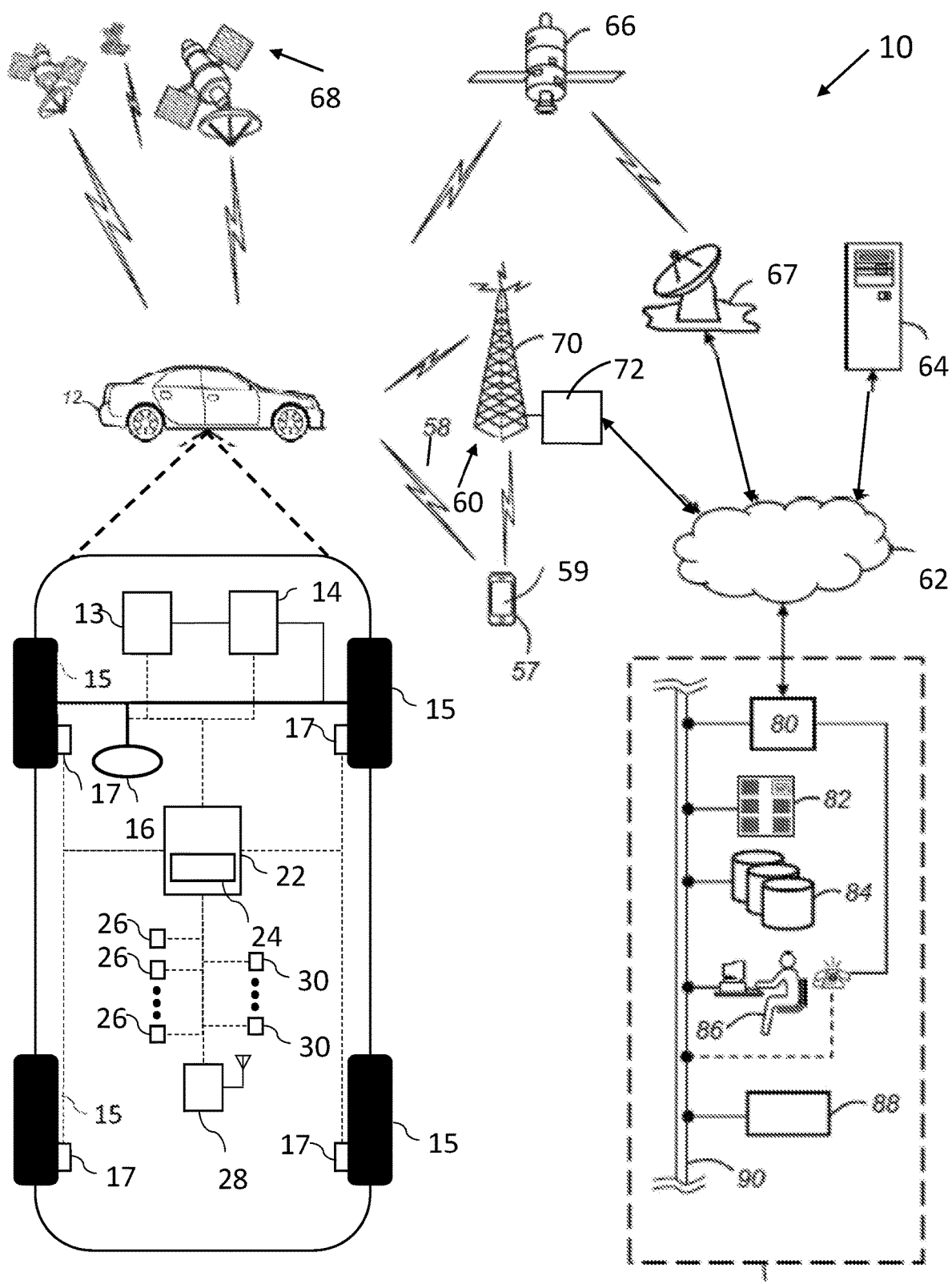
FIG. 1 shows an operating environment that comprises a mobile vehicle communication and control system for a motor vehicle according to an exemplary embodiment.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
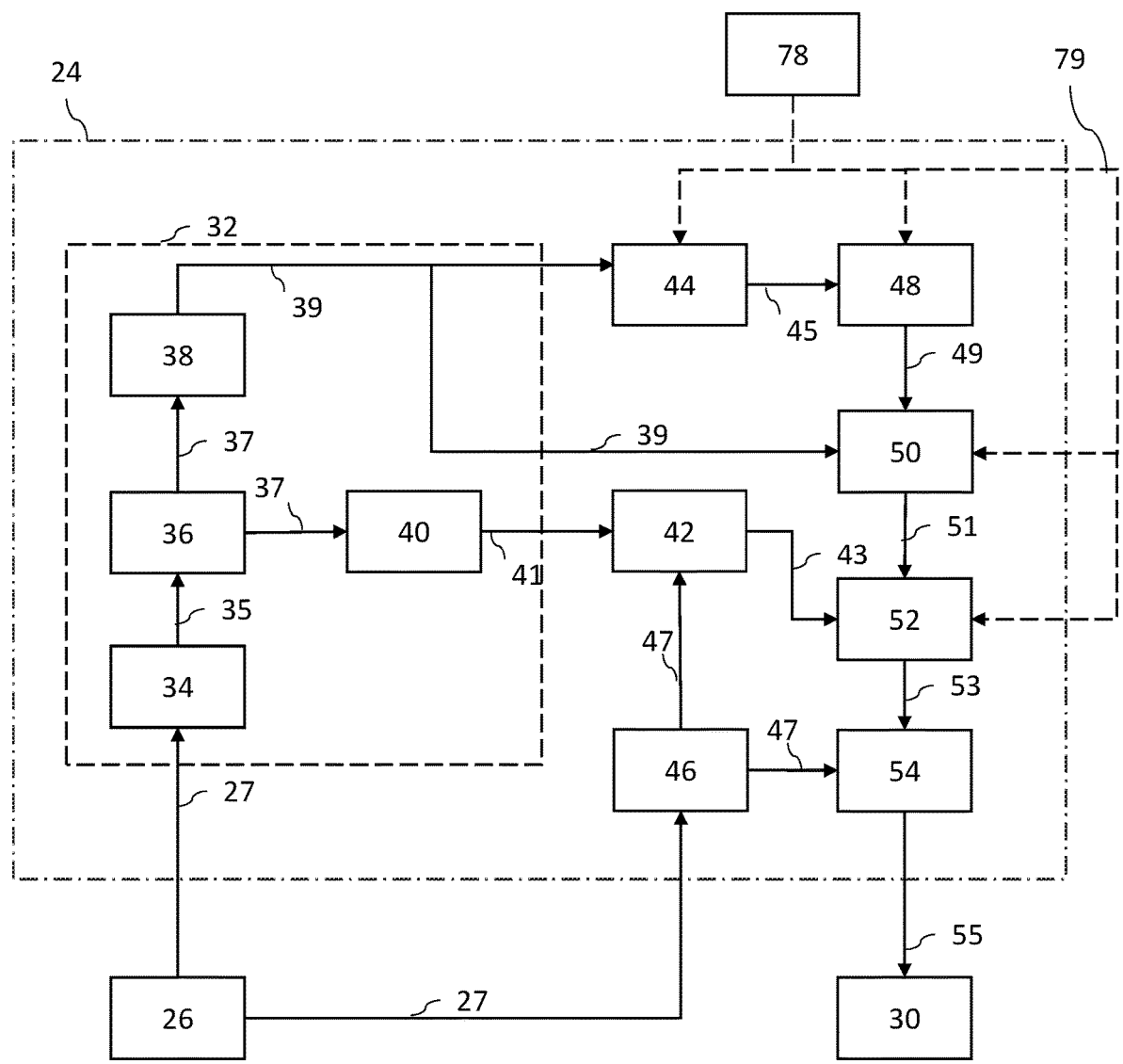
FIG. 2 shows the ADS including multiple distinct control systems for determining the presence, location, classification, and path of detected features or objects in the vicinity of the vehicle according to an exemplary embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1},A_t,D_t) \quad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1},D_t) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1},A_t,D_t) \quad \text{Equation 3}$$

where the probability of a hypothesis $H_t$ is based on the previous hypothesis $H_{t-1}$, an action $A_t$, and data $D_t$ at current time t.

Used extensively in robotics, a Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X_t'=AX_{t-1}+B\mu+\varepsilon_t \quad \text{Equation 4}$$

where $X'_t$ is a new state based on the previous state $AX_{t-1}$, $B\mu$ and $\xi_t$. Constants A and B are defined by the physics of interest, $\mu$ is typically a robotic motor command, and $\xi_t$ is a Gaussian state error prediction.

Sensor prediction is expressed as:

$$Z_t'=CX_t+\varepsilon_z \quad \text{Equation 5}$$

where $Z_t$ is the new sensor estimate, C is a function and $\xi_z$ is a Gaussian sensor error prediction.

A new predicted state estimate is expressed as:

$$X_{EST}=X_t'+K(Z_t-Z_t') \quad \text{Equation 6}$$

where the product $K(Z_t-Z_t')$ is referred to as the Kalman gain factor. If the difference between the sensor prediction $Z'_t$ and the actual sensor data $Z_t$ (that is, $Z_t-Z'_t$) is reasonably close to zero, then $X'_t$ is considered to be the new state estimate. If $Z_t-Z'_t$ is reasonably larger than zero, the $K(Z_t-Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)P(D|H)}{P(D)} \quad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

The disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
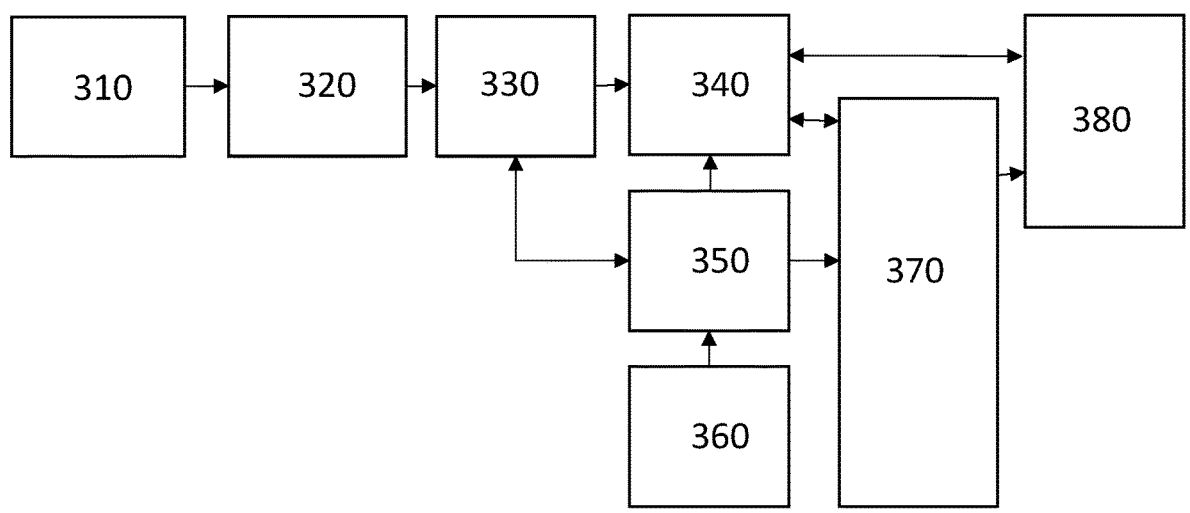
FIG. 3 shows a block diagram illustrating an exemplary implementation of a system for automatic rule learning for autonomous driving.

Turning now to FIG. 3, an exemplary block diagram illustrating an exemplary implementation of a system for automatic rule learning for autonomous driving 300 is shown. The system includes at least one sensor 310, a perception module 320, an agent motion predictor 330, a cognitive module 340, a mapping module 350 a global positioning system (GPS) 360, a self motion planner 370 and a motion controller 380.

The sensors 310 may include a variety of devices for detecting the environment surrounding the vehicle. These sensors may include visual sensors, such as electro optical or infrared cameras, LIDAR, RADAR, sonic or the like. The perception module 320 is operative to detect and classify objects on the road: cars, bicycles/bikers, pedestrians, obstacles, traffic lights and traffic signs, and other objects needed for safe driving. The perception module 320 processes data from the sensors 310 and produces information about the location of each agent, such as pedestrians or other vehicles, in the scene. This processing can include Deep Learning for camera and other visual sensors, methods such as LIDAR point cloud, and radar processing methods as well.

The agent motion predictor 330 is operative to combine data received from perception module 320 and the mapping module 350 in order to predict the motion of other agents cars, bicycles, pedestrians in the scene. These predictions can be accomplished with the use of Kalman filters, recurrent neural networks (RNN), or by other means available in the literature. It produces predictions for each agent's location up to K time steps in the future, with a variable step size. The number of steps and step size required may depend on the factors like speed of the cars, complexity of the scene and so on. Self-motion planner and motion control then take these predictions and use them to safely navigate the scenario. The mapping module 350 stores and provides current maps of the roads and intersections where the autonomous self-car is to drive. The perception module 320 may register spatial locations of perceived objects, vehicles, pedestrians, etc. to the map. The agent motion predictor 330 prediction may use the map for computation. The map may be supplied by the car's built-in navigation system.

The GPS 360 supplies current location of self-car. The accuracy of position can be improved with additional use of LIDAR and camera data from the perception module 320. The self motion planner 370 is operative to predict the motion of the self-car based on data received from the perception module 320, the mapping module 350 and the cognitive module 340 as well as the kinematic model of the self-car.

The motion control module 380 generates the control signals needed to control the vehicle. This includes control algorithms such as model predictive control, and actuators to change direction, accelerate, or slow the self-car down based on the self-motion planner 370 and cognitive module 340. The cognitive module 340 is trained to provide data for motion control module 380 during autonomous driving. The motion control module 340 uses the current state and future predictions of the agents in the scene, map data, self-motion planner data, and motion control data. This module contains submodules called "semantic" and "episodic" memory, the details for which are provided below.

The driving process can be considered as a sequence of episodes, where each episode represents a specific realization of the driving situation. For example, crossing a 4-way intersection with 4-stop signs is a driving situation that can be navigated in many ways depending on presence of other cars, pedestrians, etc. Each realization of this driving situation is called an episode. Therefore, an episode consists of a number of events where each event represents a specific action of the self-car and other agents. For example: Event A—selfcar is moving straight, Event B—self-car stops, Event C—self car yields to other agents, and so on. Every event has a time duration in time steps sampled at a specified interval T. Number of time steps in the event depends on speed of the self-car as well as speed and number of other agents, duration of traffic lights, traffic, and other factors. Number of events in episodes corresponding to the same traffic situation can also vary for the same reasons. Depending on a particular behavior and number of other agents, the same intersection can be crossed with a different number of events and time steps, creating different episodes.

The grouping of time steps into events is based on the structure of the parse trees of the time steps. Each episode is broken into events and each event consists of multiple time steps. This segmentation of events inside the episode is performed automatically by the semantic memory of the proposed system. During the training phase the semantic memory will learn two essential models: (1) the transition tensor for generation of parse trees for the time steps; (2) the temporal grammar that captures temporal relationships between events in the episode. During the testing phase, the semantic memory will create a parse tree for each time step to associate it with the corresponding event, build a sequence of events, and predict the rest of the temporal sequence of the events in the episode. In other words, model (1) is directed to the spatial relationships/interactions, (2) is temporal sequence of events.

The parse trees may represent events where each event is a specific action of the self-car such as: driving forward, waiting on a stop sign, yielding to incoming or cross traffic, etc. The segmentation of events is performed in the cognitive module that contains the spatial part of the semantic memory. All training scenarios are broken into time steps representing a snapshot or state of the agents in the scene. Each time step is represented by information describing spatial locations and states of the agents in the scene relative to the self-car and other agents, such as stop signs, traffic lights, traffic signs etc., depending on the type of intersection or road. Several detailed examples of this kind of representation will be provided below.

The spatial information of the agents in each time step is converted into an association matrix which can be considered as a compact representation of that time step and this matrix is used as an input of the training/testing algorithm. Association matrices obtained from each time step are then fed into a perceptual Expectation Maximization (EM) algorithm, which is a modified version of the inside-outside algorithm that is usually used for training Probabilistic Context-Free Grammar (PCFG). This training step produces a 3D tensor representing the extracted and optimized probabilistic rules of the spatial interaction between the agents in the scene. In other words, this tensor represents the rules of interaction between the agents provided in the training time steps. The tensor of rules can be used to generate the most probable parse trees for the time steps used for training as well as testing. The unseen time steps will show possible interactions between agents based on the rules extracted during training. After creation of the tensor, semantic memory can generate the most probable parse tree for each time step in the training set, based on the rules and probabilities in the grammar. Generation of the most probable parse trees for the test set containing unseen time steps will be described in detail below in testing phase of the semantic memory.

After training phase 1, the cognitive module goes to the next phase of training where it learns the temporal relationships between the events in the episodes provided in the training data set. Since many time steps have the same optimal parse tree, each episode can be represented as a much shorter sequence of so called events. For example, the episode has parse trees corresponding the following sequence of time steps: {AAAABBBBCCCC}. After removing duplicates, the episode can be represented as shorter sequence of events: {ABC}, similar to run length encoding compression. The number of repetitions of each time step depends on a specific realization of the episode, speed of agents, traffic situation, etc. But all these variations will have the same sequence of events: {ABC}, where A, B, and C are the events in this episode with the corresponding parse trees. Multiple time steps with the same parse tree are embodied as the same event in the original sequence: sequence of time steps {AAAAA} is event A. In other words, the event consists of time steps in which the self-car does not change its action and interaction with other agents. For example, event A represents self-car driving forward, episode B represents different situation when self-car stops, episode C—self-car yields to other agents in the scene, etc.

Phase 2 training of the semantic memory is modeled such that each episode in the training data is represented as a sequence of events. In other words, each episode is represented as a string of words (events). All these strings form a corpus of strings that can be stored in episodic memory for future retrieval or can be used for learning a temporal Probabilistic Context-Free Grammar (PCFG), which is a generative model that can be used for predictions of events in the future episodes. In addition to the learned PCFG, the cognitive module can store all unique sequences in episodic memory and use those for predictions during the testing phase as well.

The cognitive module processes data in time steps similar to the training phase. Each time step contains spatial information and state for each agent in the scene. This information is converted into the association matrix which is processed with the transition matrix, obtained during training phase 1, to find the optimal parse tree for the current time step. The optimal parse tree for the current time step is compared to the set of most probable parse trees learned during the training to find the matching one and assign an event label to the current time step. Sequential duplicate event labels are discarded. This process will form a temporal string of labels corresponding to the evolving episode in the driving scenario. The prediction of the rest of the episode can also be performed using episodic memory which holds all previously seen episodes. In this case, predictions are made by finding the matching sub-sequence of the events representing the current unfinished episode against all episodes stored in the memory.

The matched episodes are used to predict the set of events that will follow to complete the current episode. If a PCFG is used the prefix string containing event labels corresponding to the current partial episode is used to predict the rest of the sequence using rules and probabilities learned during training PCFG. Prediction of future events in the evolving episode is performed at every time step. The predictions are provided to the motion planning module to execute optimal control actions. For example, in the presence of a stop sign on a street, all episodes will contain an event corresponding stop, independent of whether or not other traffic is present.

The semantic memory is operative to handle the representative agents in the episodes which require the self-car's immediate attention. In real driving conditions there are multiple objects and therefore many possibilities that cars will be moving in groups representing incoming, crossing, and other types of traffic in the scene. In this case, the semantic analysis is applied to multiple combinations of the agents where only one object from a particular group is used. For example, if there are three cars in incoming traffic, each car will be analyzed from this group separately. The groups can be defined by the layout of driving lanes in the scenario.

The system and method is also operative to use prediction of the agent behavior. The semantic memory learns rules based on the locations of the other agents in the scene. The agent motion prediction module can generate prediction of each agent for K number of time steps forward. These predicted locations of the agents can be used for processing time steps to train phase 1 of the semantic memory and during the testing phase in the same way as it was described above.

Figure 4:
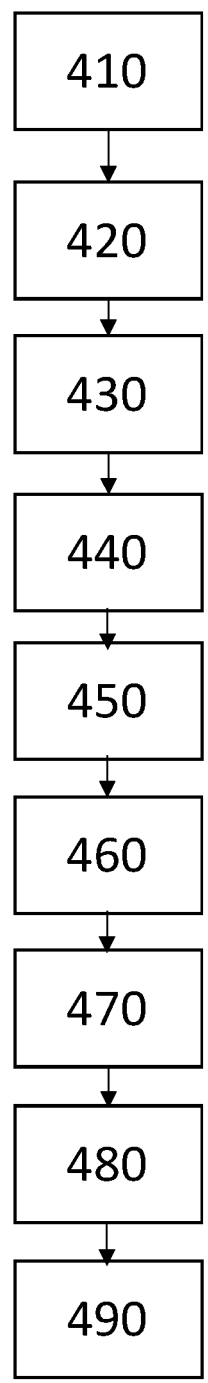
FIG. 4 shows an exemplary flow chart illustrating an exemplary implementation of a method for controlling an autonomous vehicle 400.

Turning now to FIG. 4, a flow chart illustrating an exemplary implementation of a method for controlling an autonomous vehicle 400 is shown. The method is first operative to determine an autonomous driving episode in response to a sensor signal 410. The determination may be made in response to a sensor signal from a lidar, radar, camera, GPS sensor or the like. The autonomous driving episode may be determined in response to an actual driver control, or may be simulated. The method is then operative to segment the autonomous driving episode into a first event and a second event 420. The method then segments the first event into a first time step and a second time step and the second event into a third time step and a fourth time step 430.

At the next step, the method is operative to generate a first association matrix in response to the first time step, a second association matrix in response to the second time step, a third association matrix in response to the third time step and a fourth association matrix in response to the fourth time step 440. A transition matrix is then generated in response to the first association matrix, the second association matrix, the third association matrix and the fourth association matrix 450. The method is then operative to generate a 3D tensor in response to the transition matrix 460. The method then determines a probable time step in response to the 3D tensor 470 and generates a probable event in response to the probable time step 480. Finally the system is operative to generate a control signal for controlling an autonomous vehicle in response to the probable event 490.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle comprising:
receiving, by a processor of the vehicle, a sensor signal from a sensor of the vehicle;
determining, by the processor, an autonomous driving episode in response to the sensor signal;
segmenting, by the processor, the autonomous driving episode into a first event and a second event;
segmenting, by the processor, the first event into a first time step and a second time step and the second event into a third time step and a fourth time step;
generating, by the processor, a first association matrix in response to the first time step, a second association matrix in response to the second time step, a third association matrix in response to the third time step and a fourth association matrix in response to the fourth time step;
generating, by the processor, a transition matrix in response to the first association matrix, the second association matrix, the third association matrix and the fourth association matrix;
generating, by the processor, a 3D tensor in response to the transition matrix;
determining, by the processor, a probable time step in response to the 3D tensor;
generating, by the processor, a probable event in response to the probable time step; and
generating, by the processor, a control signal for controlling an autonomous vehicle in response to the probable event.

2. The method of claim 1 wherein the sensor signal is generated by at least one of a radar, a lidar, a global positioning services receiver, and a video camera of the vehicle.

3. The method of claim 1 wherein probable event is stored in a memory until a similar event is encountered by the vehicle.

4. The method of claim 1 wherein a first probable parse tree is generated in response to the first time step and a second probable parse tree is generated in response to the second time step.

5. The method of claim 1 wherein an optimal parse tree is generated in response to the first time step and the second time step.

6. The method of claim 1 wherein the transition matrix is used to determine an optimal parse tree for a current time step.

7. The method of claim 1 wherein the control signal is generated in response to a second control signal and an archived episode stored in an episodic memory.

8. The method of claim 1 wherein the autonomous driving episode is matched to an archived episode to generate a plurality of predicted events.

9. The method of claim 8 the control signal is generated in response to the plurality of predicted events.

10. The method of claim 1 wherein the probable event is determined by a cognitive module and the control signal is generated by a motion controller.

11. An apparatus comprising:
a sensor configured to sense an environment proximate to an autonomous vehicle and generate a sensor signal;
a perception module configured to, by a processor, detect an agent within the environment in response to the sensor signal;
an agent motion predictor configured to, by a processor, predict a motion of the agent within the environment in response to the detection of the agent;

cognitive module configured to, by a processor:
- determine an autonomous driving episode in response to the predicted motion of the agent,
- segment the autonomous driving episode into a first event and a second event;
- segment the first event into a first time step and a second time step and the second event into a third time step and a fourth time step;
- generate, a first association matrix in response to the first time step, a second association matrix in response to the second time step, a third association matrix in response to the third time step and a fourth association matrix in response to the fourth time step;
- generate a transition matrix in response to the first association matrix, the second association matrix, the third association matrix and the fourth association matrix;
- generate a 3D tensor in response to the transition matrix;
- determine a probable time step in response to the 3D tensor; and
- generate a probable event in response to the probable time step; and a motion control module configured to, by a processor, receive the probable event and control the autonomous vehicle in response to the probable event.

12. The apparatus of claim 11 wherein the sensor is at least one of a radar, a lidar, a global positioning services receiver, and a video camera of the autonomous vehicle.

13. The apparatus of claim 11 wherein probable event is stored in a memory until a similar event is encountered by the autonomous vehicle.

14. The apparatus of claim 11 wherein a first probable parse tree is generated in response to the first time step and a second probable parse tree is generated in response to the second time step.

15. The apparatus of claim 11 wherein an optimal parse tree is generated in response to the first time step and the second time step.

16. The apparatus of claim 11 wherein the transition matrix is used to determine an optimal parse tree for a current time step.

17. The apparatus of claim 11 wherein the control signal is generated in response to a second control signal and an archived episode stored in an episodic memory.

18. The apparatus of claim 11 wherein the autonomous driving episode is matched to an archived episode to generate a plurality of predicted events.

19. The apparatus of claim 18 wherein the control signal is generated in response to the plurality of predicted events.

* * * * *